US012640613B2

(12) United States Patent
Eguchi et al.

(10) Patent No.: US 12,640,613 B2
(45) Date of Patent: May 26, 2026

(54) ROTATING ELECTRIC MACHINE

(71) Applicants:Nissan Motor Co., Ltd., Yokohama (JP); JATCO LTD, Fuji (JP)

(72) Inventors: Kazuki Eguchi, Kanagawa (JP); Tatsuya Uchida, Kanagawa (JP); Yiwei Zhao, Kanagawa (JP); Fumio Honda, Kanagawa (JP); Yusuke Suzuki, Iwata (JP); Yojiro Mochizuki, Fujinomiya (JP)

(73) Assignees: Nissan Motor Co., Ltd., Yokohama (JP); JATCO LTD, Fuji (JP)

( * ) Notice: Subject to any disclaimer, the term of this patent is extended or adjusted under 35 U.S.C. 154(b) by 191 days.

(21) Appl. No.: 18/580,213

(22) PCT Filed: Jul. 20, 2021

(86) PCT No.: PCT/JP2021/027210
§ 371 (c)(1),
(2) Date: Jan. 18, 2024

(87) PCT Pub. No.: WO2023/002584
PCT Pub. Date: Jan. 26, 2023

(65) Prior Publication Data
US 2025/0088063 A1     Mar. 13, 2025

(51) Int. Cl.
H02K 5/10 (2006.01)
H02K 5/20 (2006.01)

(52) U.S. Cl.
CPC ................. H02K 5/10 (2013.01); H02K 5/20 (2013.01)

(58) Field of Classification Search
CPC ............ H02K 5/10; H02K 5/20; H02K 5/203; H02K 2213/03
See application file for complete search history.

(56) References Cited

U.S. PATENT DOCUMENTS

| | | | | |
|---|---|---|---|---|
| 3,897,178 | A | * | 7/1975 | Palloch .................... F04D 13/06 |
| | | | | 417/369 |
| 10,554,092 | B2 | * | 2/2020 | Ojima ...................... H02K 9/00 |
| 2015/0069862 | A1 | * | 3/2015 | Bulatow ................ H02K 5/203 |
| | | | | 310/43 |

FOREIGN PATENT DOCUMENTS

| | | | | |
|---|---|---|---|---|
| DE | 102008035896 | A1 | * | 2/2010 ............. H02K 5/203 |
| DE | 102011076532 | A1 | | 11/2012 |

(Continued)

OTHER PUBLICATIONS

English translation for DE 102017219517 A1, acessed Sep. 23, 2025 via Espacenet <https://translationportal.epo.org/emtp/translate/?ACTION=description-retrieval&COUNTRY=DE&ENGINE=google&FORMAT=docdb&KIND=A1&LOCALE=en_EP&NUMBER=102017219517&SRCLANG=de&TRGLANG=en> (Year: 2019).*

*Primary Examiner* — Jeremy A Luks
(74) *Attorney, Agent, or Firm* — Spencer Fane LLP

(57) ABSTRACT

A rotating electric machine includes an inner housing and an outer housing. An inner circumferential surface of the outer housing includes a first cylindrical surface contacting first sealing member, a second cylindrical surface contacting a second sealing member, and a third cylindrical surface in which an end part of the inner housing is press-fitted into. The second cylindrical surface has a smaller diameter than the first cylindrical surface and the third cylindrical surface has a smaller diameter than the second cylindrical surface and is provided closer to the bottom than the second cylindrical surface. The first sealing member contacts the first cylindrical surface and the second sealing member contacts the second cylindrical surface to form a gap in an axial direction between the end part of the inner housing and the third cylindrical surface where the inner housing has been inserted into the outer housing.

3 Claims, 3 Drawing Sheets

(56)          References Cited

FOREIGN PATENT DOCUMENTS

| DE | 102012213237 | A1 | * | 1/2014 | ............. | H02K 5/203 |
| DE | 102014202912 | A1 | * | 8/2015 | ............. | H02K 5/203 |
| DE | 102017219517 | A1 | * | 5/2019 | ............. | H02K 5/203 |
| WO | 2020/213052 | A1 | | 10/2020 | | |

* cited by examiner

ROTATING ELECTRIC MACHINE

CROSS-REFERENCE TO RELATED APPLICATIONS

This application is a U.S. national stage application of International Application No. PCT/JP2021/027210, filed on Jul. 20, 2021.

BACKGROUND

Technical Field

The present invention relates to a rotating electric machine that has a stator and a rotor.

Background Information

WO2020/213052A1 describes a rotating electric machine in which a cylindrical inner housing is provided within a cylindrical outer housing, and a coolant flow path is formed between the aforementioned housings.

SUMMARY

In the rotating electric machine described in WO2020/213052A1, when the inner housing is assembled in the outer housing, one end of the inner housing is press-fitted to the outer housing, and a flange part provided on the inner housing is fixed to the outer housing. However, in the rotating electric machine described in WO2020/213052A1, if the end of the inner housing is not properly centered during press-fitting, the inner housing may be press-fitted into the outer housing in a tilted state, causing the risk of coolant leakage from the sealing portion.

Thus, the object of the present invention is to provide a rotating electric machine that can more reliably center of the end part of the inner housing when the inner housing is assembled into the outer housing.

According to one aspect of the present invention, the rotating electric machine comprises a cylindrical inner housing accommodating a stator and a rotor; a bottomed cylindrical outer housing covering an outer circumference of the inner housing; a first sealing member disposed in an annular shaped first groove in the outer circumferential surface of the inner housing, and sealing between the outer circumferential surface of the inner housing and an inner circumferential surface of the outer housing; a second sealing member disposed in an annular shaped second groove in the outer circumferential surface of the inner housing spaced from the first groove, and sealing between the outer circumferential surface of the inner housing and the inner circumferential surface of the outer housing; and a coolant flow channel formed by a region enclosed by the first sealing member, the second sealing member, the inner housing and the outer housing so that through which coolant flows to cool the stator. The inner circumferential surface of the outer housing includes a first cylindrical surface disposed adjacent an opening side and contacting the first sealing member, a second cylindrical surface having a smaller diameter than the first cylindrical surface and disposed closer to a bottom side than the first cylindrical surface and contacting the second sealing member, and a third cylindrical surface having a smaller diameter than the second cylindrical surface and disposed closer to the bottom side than the second cylindrical surface and into which an end part of the inner housing is press-fitted. In the rotating electric machine, the first sealing member contacts the first cylindrical surface or the second sealing member contacts the second cylindrical surface to form a gap in an axial direction of the inner housing between the end part of the inner housing and the third cylindrical surface where the inner housing is inserted into the outer housing.

According to the present invention, before the end part of the inner housing contacts the third cylindrical surface, the first sealing member contacts the first cylindrical surface or the second sealing member contacts the second cylindrical surface, so that the inner housing can be centered before the end part of the inner housing is press-fitted. Thus, when the inner housing and outer housing are assembled, the end part of the inner housing can thereby be press-fitted into the outer housing without the inner housing being tilted with respect to the outer housing.

BRIEF DESCRIPTION OF THE DRAWINGS

Referring now to the attached drawings which form a part of this original disclosure.

DETAILED DESCRIPTION OF EMBODIMENTS

An embodiment of the present invention will be described below with reference to the appended drawings.

Figure 1:
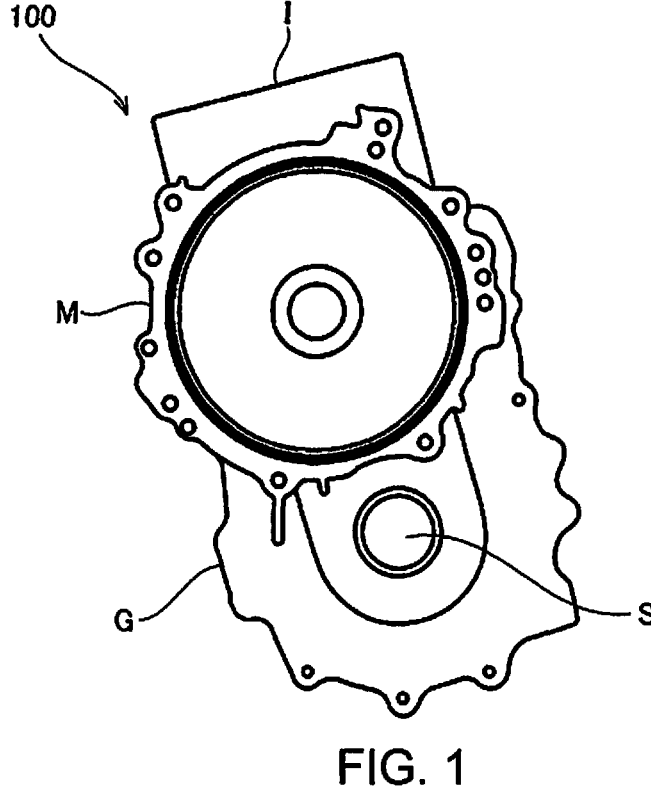
FIG. 1 is a schematized diagram of a drive unit having a rotating electric machine according to the present embodiment, as seen from the front.
Figure 2:
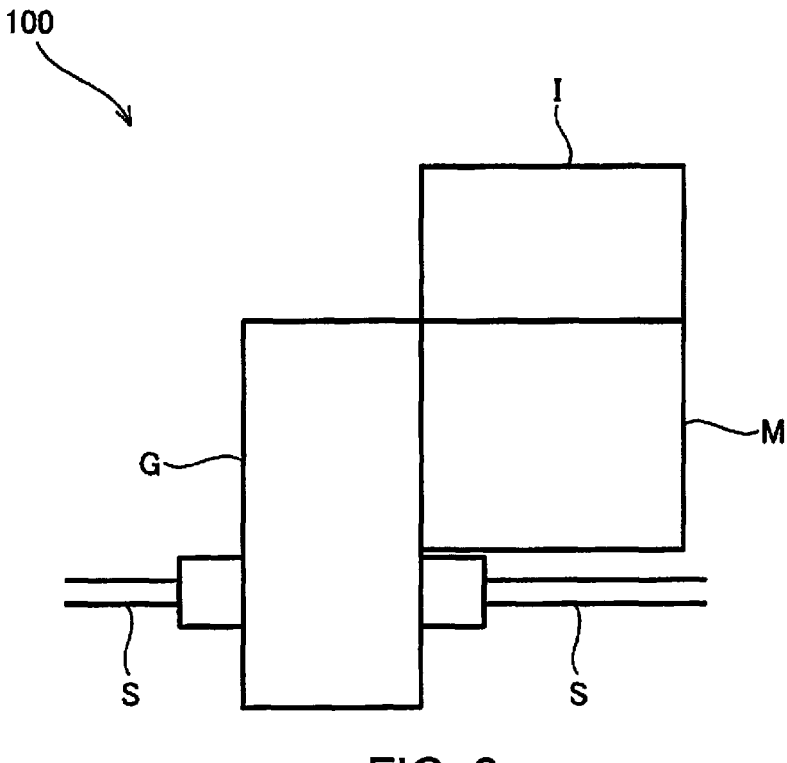
FIG. 2 is a schematized diagram of a drive unit having a rotating electric machine according to the present embodiment, as from the side.
Figure 3:
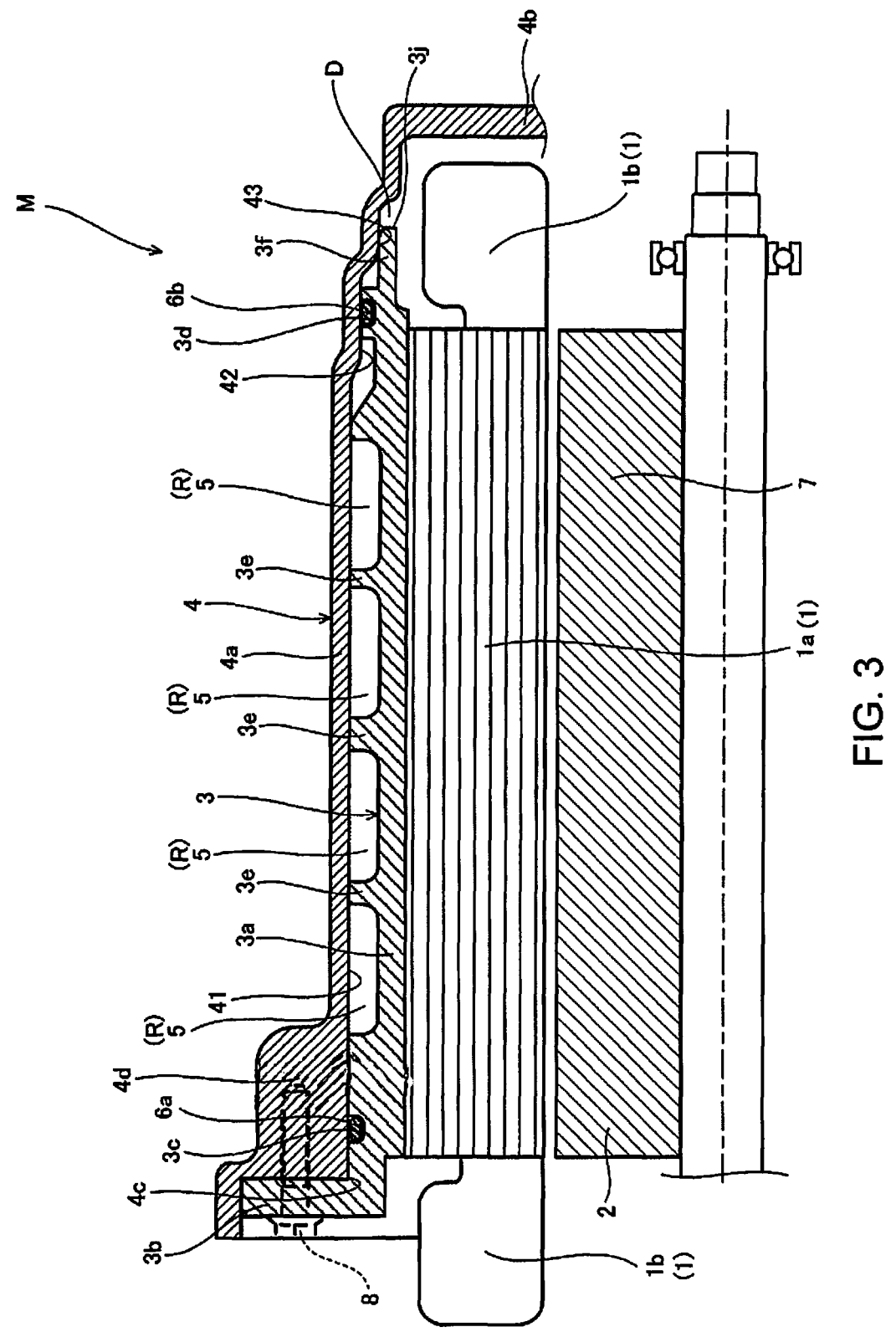
FIG. 3 is a partial cross-sectional view of the main part of the rotating electric machine according to the present embodiment.

FIG. 1 is a schematized diagram of a drive unit 100 equipped with a rotating electric machine M of the embodiment as seen from the front. FIG. 2 is a schematized diagram of the drive unit 100 as seen from the side. FIG. 3 is a partial cross-sectional view in the axial direction showing the main parts of the rotating electric machine M.

The drive unit 100 is mounted on a vehicle. As shown in FIGS. 1 and 2, the drive unit 100 includes the rotating electric machine M, an inverter I, and a reduction gear G. The drive unit 100 is used, for example, as a drive source for a series hybrid vehicle that drives the rotating electric machine M using electric power generated by a generator motor (not shown) using the power of an internal combustion engine (not shown). Not limited in this way, the drive unit 100 may also be used, for example, as a drive source for an electric vehicle driven by battery power.

As shown in FIGS. 1 and 2, the inverter I is disposed at the top of the rotating electric machine M. Bolts are used to fix the case of the inverter I to the housing of the rotating electric machine M, thereby integrating the rotating electric machine M and the inverter I.

The reduction gear G is fixed to the housing of the rotating electric machine M with bolts. The input shaft (not shown) of the reduction gear G is connected to a rotary shaft 7 of the rotating electric machine M. The driving force of the rotating electric machine M is reduced by the reduction gear G and transmitted to the drive wheels (not shown) via a shaft S.

The rotating electric machine M of the present embodiment is an electric motor/generator that operates as an electric motor and a generator. More specifically, the rotating electric machine M operates as an electric motor when driven to rotate by being supplied with power from a battery (not shown) and functions as a generator when receiving rotational energy from the drive wheels.

The rotating electric machine M is, for example, a synchronous rotating electric machine. When operating as an electric motor, the rotating electric machine M operates by the application of three-phase alternating current produced by the inverter I based on a command from a controller (not shown). When operating as a generator, the rotating electric machine M generates electric power by rotating due to the driving force from the drive wheels (not shown) and charges the battery.

As shown in FIG. 3, the rotating electric machine M includes a stator 1, a rotor 2, an inner housing 3 that accommodates the stator 1 and the rotor 2, and an outer housing 4 that covers the outer circumferential surface of the inner housing 3.

The stator 1 includes a stator core 1a and a stator coil 1b wound around the stator core 1a. The rotor 2 is provided on the inner circumference of the stator 1 with a small gap between the rotor and the stator 1. The rotor 2 is attached to the rotary shaft 7 and supported so as to be rotatable within the stator 1.

As shown in FIG. 3, the inner housing 3 has the form of a cylinder. The inner housing 3 is made from, for example, an aluminum alloy and is formed by casting or the like. The inner housing 3 includes a cylindrical portion 3a for accommodating the stator 1 and the rotor 2, and a flange 3b that is provided at one end of the cylindrical portion 3a and that abuts an opening 4c at one end of the outer housing 4. The inner housing 3 is fixed to the outer housing 4 by using bolts 8 to fasten the flange portion 3b to the outer housing 4.

The outer circumferential surface of the cylindrical portion 3a of the inner housing 3 has an annular first groove 3c and an annular second groove 3d. The first groove 3c and the second groove 3d are separated from each other in the axial direction of the inner housing 3b. Inside the first and second grooves 3c and 3d, an O-ring 6a as a first sealing member and an O-ring 6b as a second sealing member are respectively provided to seal between the outer circumferential surface of the inner housing 3 and the inner circumferential surface of the outer housing 4.

Further, the inner housing 3 also includes a rib 3e that protrudes into a region R from the outer circumferential surface of the cylindrical portion 3a and that extends in the form of a helix along the outer circumferential surface of the cylindrical portion 3a of the inner housing 3. The rib 3e is formed so as to provide a small gap between the rib and the inner circumferential surface of the outer housing 4.

The outer housing 4 has the form of a cylinder with a closed bottom. The outer housing 4 is made from, for example, an aluminum alloy and is formed by casting or the like. The outer housing 4 includes a cylindrical portion 4a that covers the outer circumference of the inner housing 3, a bottom portion 4b that closes one end of the cylindrical portion 4a, and a thick-walled portion 4d that is thicker than the cylindrical portion 4a and that is provided on the opening 4c side.

A coolant flow channel 5, through which a coolant to cool the stator 1 flows, is provided between the outer circumference of the inner housing 3 and the inner circumference of the outer housing 4. The coolant flow channel 5 is formed to cover the outer circumference of the stator 1 within a region R surrounded by the O-ring 6a, the O-ring 6b, the outer circumferential surface of the inner housing 3, and the inner circumferential of the outer housing 4. In the present embodiment, the coolant flow channel 5 is formed so that the coolant flows along the helically extending rib 3e on the outer circumferential surface of the inner housing 3, i.e., the coolant flow channel 5 has the form of a helix within the region R.

The inner circumferential surface of the cylindrical portion 4a of the outer housing 4 has a first cylindrical surface 41 that is provided on the opening 4c side and that contacts the O-ring 6a, a second cylindrical surface 42 that has a smaller diameter than the first cylindrical surface 41 and that is provided closer to the bottom 4b than the first cylindrical surface 41 and that contacts the O-ring 6b, and a third cylindrical surface 43 that has a smaller diameter than the second cylindrical surface 42 and that is provided closer to the bottom 4b than the second cylindrical surface 42 and into which an end part 3f of the inner housing 3 is press-fitted.

In the rotating electric machine M of the present embodiment, the inner housing 3 is inserted through the opening 4c of the outer housing 4, and the end part 3f of the inner housing 3 is press-fitted into the third cylindrical surface 43 of the outer housing 4. The inner housing 3 is then fixed to the outer housing 4 by fastening the flange portion 3b of the inner housing 3 to the thick-walled portion 4d of the outer housing 4 using bolts 8.

It should be noted that if the end part 3f of the inner housing 3 is not centered properly during the press-fitting of the inner housing 3, the inner housing 3 may be press-fitted into the outer housing 4 with the center axes of the inner housing 3 and the outer housing 4 misaligned or with the tilting of the inner housing 3. If the inner housing 3 is press-fitted in this state, there is the risk that, for example, the sealing portion, such as the O-rings 6a and 6b, may become misaligned, causing the coolant to leak, or that there may be twisting between the inner housing 3 and the outer housing 4, resulting in contamination.

Therefore, in the rotating electric machine M of the present embodiment, the inner housing 3 is centered by at least the O-ring 6a coming in contact with the first cylindrical surface 41 or the O-ring 6b coming in contact with the second cylindrical surface 42, before the end part 3f of the inner housing 3 contacts the third cylindrical surface 43 in the axial direction of the housing 3. The specific configuration is described below.

Figure 4:
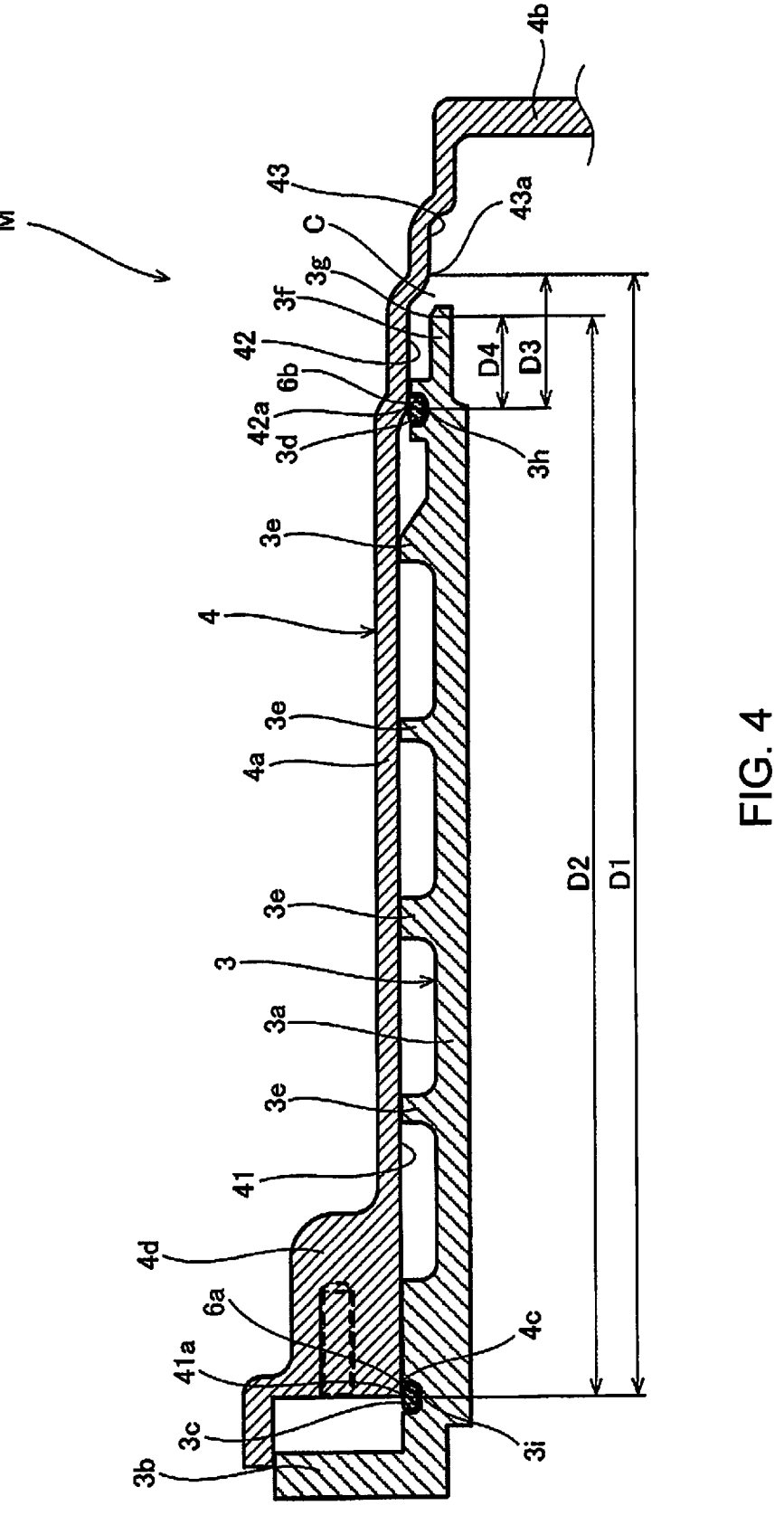
FIG. 4 is a diagram for explaining the dimensional relationship between the inner housing and the outer housing in the rotating electric machine of the present embodiment.

FIG. 4 shows the state when the inner housing 3 is inserted into the outer housing 4 through the opening 4c, that is, the O-ring 6a contacts the first cylindrical surface 41, and the O-ring 6b contacts the second cylindrical surface 42 of the outer housing 4. As shown in FIG. 4, when the O-ring 6a contacts the first cylindrical surface 41 and the O-ring 6b contacts the second cylindrical surface 42, there is a gap C between the end part 3f of the inner housing 3 and the third cylindrical surface 43 of the outer housing 4 in the axial direction of the inner housing 3. In other words, in the rotating electric machine M, before the end part 3f of the inner housing 3 contacts the third cylindrical surface 43, the O-ring 6a contacts the first cylindrical surface 41 and the O-ring 6b contacts the second cylindrical surface 42.

In order to realize this configuration, in the rotating electric machine M, the first groove 3c is formed in a position such that D1>D2, where D1 is the axial distance from an end 41a on the opening 4c side of the first cylindrical surface 41 to an end 43a on the opening 4c side of the third cylindrical surface 43, and D2 is the distance between an end 3g on the bottom 4b side of the outer circumference of the end part 3f that contacts the third cylindrical surface 43 and a center position 3i in the axial direction of the first groove 3c. The second groove 3d is formed in a position such that D3>D4, where D3 is the distance from an end 42a on the opening 4c side of the second cylindrical surface 42 to the end 43a on the opening 4c side of the third cylindrical surface 43, and D4 is the distance between the end 3g of the end part 3f and a center position 3h of the second groove 3d in the axial direction.

By disposing the first groove 3c and the second groove 3d in such positions, the O-ring 6a can make contact with the first cylindrical surface 41, and the O-ring 6b can make contact with the second cylindrical surface 42 before the end part 3f of the inner housing 3 contacts the third cylindrical surface 43. If the O-ring 6a is in the position shown in FIG. 4, i.e., the position where the center position 3i of the first groove 3c in the axial direction coincides with the end 41a on the opening 4c side of the first cylindrical surface 41 in the axial direction, this O-ring will make secure contact with the first cylindrical surface 41 of the outer housing 4. Similarly, if the center position 3h in the axial direction of the second groove 3d and the end 42a on the 4c side of the opening of the second cylindrical surface 42 are coincident, the O-ring 6b will make secure contact the second cylindrical surface 42 of the outer housing 4. Therefore, by disposing the first groove 3c and second groove 3d in the positions described above, the inner housing 3 can be centered by bringing the O-rings 6a, 6b into contact with the first cylindrical surface 41 and the second cylindrical surface 42, respectively, before the end part 3f of the inner housing 3 is press-fitted.

It should be noted that after the O-ring 6a contacts the first cylindrical surface 41 and the O-ring 6b contacts the second cylindrical surface 42 of the outer housing 4, the inner housing 3 is inserted farther toward the bottom 4b of the outer housing 4, so that the end part 3f of the inner housing 3 is press-fitted into the third cylindrical surface 43. When the inner housing 3 is further inserted toward the bottom 4b of the outer housing 4, the flange 3b of the inner housing 3 is made to come into contact with the opening 4c (the thick-walled portion 4d) of the outer housing 4.

In this state, bolts 8 are used to secure the flange portion 3b to the outer housing 4, thereby integrating the inner housing 3 and the outer housing 4 and completing the assembly.

As shown in FIG. 3, in the rotating electric machine M of the present embodiment, when the flange portion 3b of the inner housing 3 contacts the opening 4c (the thick-walled portion 4d) of the outer housing 4, there is a gap D between end surface 3j of the inner housing 3 and the outer housing 4 in the axial direction. Thus, the flange portion 3b can reliably make contact with the opening 4c (the thick-walled portion 4d) of the outer housing 4, so that the end surface 3j of the inner housing 3 is pressed against the outer housing 4, and the inner housing 3 can be prevented from becoming deformed.

As described above, in the rotating electric machine M of the present embodiment, before the end part 3f of the inner housing 3 contacts the third cylindrical surface 43, the O-ring 6b contacts the second cylindrical surface 42 and the O-ring 6a contacts the first cylindrical surface 41. The inner housing 3 can thereby be centered before the end part 3f of the inner housing 3 is press-fitted. Thus, when the inner housing 3 and the outer housing 4 are assembled, the end part 3f of the inner housing 3 is prevented from being press-fitted into the outer housing 4 with the center axes of the inner housing 3 and the outer housing 4 misaligned or with tilting of the inner housing 3 with respect to the outer housing 4.

In the above-described embodiment, the case in which the O-rings 6a and 6b come in contact with the first cylindrical surface 41 and the second cylindrical surface 42, respectively, at the same time is described as an example, but the O-rings 6a and 6b need not come in contact with the first cylindrical surface 41 and the second cylindrical surface 42, respectively, at the same time during assembly. More specifically, if the O-rings 6a and 6b come in contact with the first cylindrical surface 41 and the second cylindrical surface 42, respectively, before the end part 3f of the inner housing 3 comes in contact with the third cylindrical surface 43, the inner housing 3 will be centered at two places, the O-rings 6a and 6b, thereby ensuring reliable centering of the inner housing 3.

If the O-rings 6a and 6b do not come in contact with the first and second cylindrical surfaces 41 and 42 at the same time, for example, it is preferable that the first groove 3c and second groove 3d be formed so that when the O-ring 6b comes in contact with the second cylindrical surface 42, the O-ring 6a is located outside the first cylindrical surface 41. In this configuration, the O-ring 6a comes in contact with the first cylindrical surface 41 after the O-ring 6b comes in contact with the second cylindrical surface 42. In the configuration in which the O-ring 6a comes in contact with the first cylindrical surface 41 before the O-ring 6b comes in contact with the second cylindrical surface 42, if the inner housing 3 is inserted at an inclination with respect to the outer housing 4, when the O-ring 6a comes in contact with the second cylindrical surface 42, the inner housing 3 will be in a tilted state with the O-ring 6a acting as a fulcrum. Since the distance between the fulcrum, i.e., the O-ring 6a, and the end part 3f is relatively long, the amount of radial misalignment of the end part 3f will be large. Therefore, by configuring the O-ring 6b to come in contact with the second cylindrical surface 42 before the O-ring 6a comes in contact with the first cylindrical surface 41, even if the inner housing 3 is inserted at an inclination with respect to the outer housing 4, this will cause the inner housing 3 to be in a tilted state with the O-ring 6b near the end part 3f acting as the fulcrum. Since the distance between the fulcrum, i.e., the O-ring 6b, and the end part 3f is relatively short, the amount of radial misalignment of the end part 3f will be small. Therefore, by means of this configuration, since the amount of radial misalignment of the end part 3f is reduced, the inner housing 3 can be more reliably prevented from being press-fitted into the outer housing 4 in a tilted state.

The O-ring 6b may come in contact with the second cylindrical surface 42 after the O-ring 6a comes in contact with the first cylindrical surface 41. Even with this configuration, the inner housing 3 will be centered at two places, the O-rings 6a and 6b, before the end part 3f of the inner housing 3 comes in contact with the third cylindrical surface 43, so that the inner housing 3 can be centered.

Further, during assembly, if the amount of tilt and misalignment of the inner housing 3 are within an allowable range, the configuration can also be allowed when at least only the O-ring 6a may come in contact with the first cylindrical surface 41 before the end part 3f of the inner housing 3 comes in contact with the third cylindrical surface 43, or only the O-ring 6b may come in contact with the second cylindrical surface 42 before the end part 3f of the inner housing 3 comes in contact with the third cylindrical surface 43. Also in this case, the O-ring 6a or O-ring 6b can be used to center the inner housing 3 before the end part 3*f* of the inner housing 3 is press-fitted into the third cylindrical surface 43.

The configuration, operation, and effects of the embodiment of the present invention with the above-described configuration will now be summarized.

The rotating electric machine M comprises a cylindrical inner housing 3 that accommodates a stator 1 and a rotor 2; a bottomed cylindrical outer housing 4 that covers the outer circumference of the inner housing 3; an O-ring 6*a* (the first sealing member) that is seated in an annular shape first groove 3*c* in the outer circumferential surface of the inner housing 3 and seals between the outer circumferential surface of the inner housing 3 and the inner circumferential surface of the outer housing 4; an O-ring 6*b* (the second sealing member) that is seated in an annular shape second groove 3*d* in the outer circumferential surface of the inner housing 3 at an interval from the first groove 3*c* and seals between the outer circumferential surface of the inner housing 3 and the inner circumferential surface of the outer housing 4; and a coolant flow channel 5 through which coolant to cool the stator 1 flows and which is formed by a region R enclosed by the O-ring 6*a* (the first sealing member), the O-ring 6*b* (the second sealing member), the inner housing 3, and the outer housing 4. The inner circumferential surface of the outer housing 4 includes a first cylindrical surface 41 that is provided on the opening 4*c* side and that is brought into contact with the O-ring 6*a* (the the first sealing member), a second cylindrical surface 42 that has a smaller diameter than the first cylindrical surface 41 and that is located closer to the bottom 4*b* than the first cylindrical surface and that is brought into contact with the O-ring 6*b* (the second sealing member), and a third cylindrical surface 43 that has a smaller diameter than the second cylindrical surface 42 and that is located closer to the bottom 4*b* than the second cylindrical surface 42, and into which the end part 3*f* of the inner housing 3 is press-fitted. In the rotating electric machine M, once the inner housing 3 is inserted into the outer housing 4, the O-ring 6*a* (the first sealing member) is brought into contact with the first cylindrical surface 41 or the O-ring 6*b* (the second sealing member) is brought into contact with the second cylindrical surface 42, forming a gap C in the axial direction of the inner housing 3 between the end part 3*f* of the inner housing 3 and the third cylindrical surface 43

As described above, in the rotating electric machine M of the present embodiment, before the end part 3*f* of the inner housing 3 contacts the third cylindrical surface 43, the O-ring 6*b* contacts the second cylindrical surface 42 or the O-ring 6*a* contacts the first cylindrical surface 41. The inner housing 3 can thereby be centered before the end part 3*f* of the inner housing 3 is press-fitted. Thus, when the inner housing 3 and the outer housing 4 are assembled, the end part 3*f* of the inner housing 3 is prevented from being press-fitted into the outer housing 4 with the center axes of the inner housing 3 and the outer housing 4 misaligned or with tilting of the inner housing 3 with respect to the outer housing 4.

In the rotating electric machine M, when the inner housing 3 is inserted into the outer housing 4, at the time when the O-ring 6*a* (the first sealing member) contacts the first cylindrical surface 41 and the O-ring 6*b* (the second sealing member) contacts the second cylindrical surface 42, there is a gap C in the axial direction of the inner housing 3 between the end part 3*f* of the inner housing 3 and the third cylindrical surface 43.

By this configuration, the O-rings 6*a* and 6*b* come in contact with the first cylindrical surface 41 and the second cylindrical surface 42, respectively, before the end part 3*f* of the inner housing 3 is press-fitted. The inner housing 3 will thus be centered at two places, the O-rings 6*a* and 6*b*, thereby ensuring reliable centering of the inner housing 3.

In the rotating electric machine M, when the inner housing 3 is inserted into the outer housing 4, the O-ring 6*a* (the first sealing member) comes in contact with the first cylindrical surface 41 after the O-ring 6*b* (the second sealing member) comes in contact with the second cylindrical surface 42.

By this configuration, even if the inner housing 3 is at an inclination with respect to the outer housing 4, the contact of the O-ring 6*b* with the second cylindrical surface 42 will cause the inner housing 3 to be in a tilted state with the O-ring 6*b* near the end part 3*f* acting as a fulcrum. Thus, the amount of tilting of the end part 3*f* will be reduced, thereby preventing the end part 3*f* from being press-fitted into the outer housing 4 in a tilted state.

In the rotating electric machine M, a flange portion 3*b* that contacts the opening 4*c* of the outer housing 4 is provided at one end of the inner housing 3. When the flange portion 3*b* comes in contact with the outer housing 4, there is a gap D in the axial direction between the end surface 3*j* of the inner housing 3 and the outer housing 4.

By this configuration, the flange portion 3*b* can reliably make contact with the opening 4*c* of the outer housing 4. This prevents the end surface 3*j* of the inner housing 3 from being pressed against the outer housing 4 and prevents excessive twisting of the inner housing 3.

Although an embodiment of the present invention was described above, the configurations described in the above embodiment and each variant are only a portion of the of application examples of the present invention and do not limit the technical scope of the present invention.

In the embodiment described above, a case in which the rotating electric machine M is an electric motor generator was explained as an example, but the rotating electric machine M may be a generator or an electric motor. Further, the rotating electric machine M is not limited to use as a drive source for vehicles, but may be used in any type of device.

For example, in the rotating electric machine M, the rib 3*e* need not be provided. Further, the above-described embodiment, the O-rings 6*a* and 6*b* are used as examples of the first and second sealing members, but any type of sealing member may be used, such as an X-ring.

In the above-described embodiment, a case in which the flange portion 3*b* of the inner housing 3 contacts the opening 4*c* of the outer housing 4 was described as an example, but the present invention is not limited thereto; for example, a boss may be provided on the outer housing 4, and the flange portion 3*b* may come in contact with the boss.

The invention claimed is:

1. A rotating electric machine comprising:

a stator;

a rotor;

a cylindrical inner housing accommodating the stator and the rotor;

a bottomed cylindrical outer housing covering an outer circumference of the inner housing;

a first sealing member disposed in an annular shaped first groove in the outer circumferential surface of the inner housing, and sealing between the outer circumferential surface of the inner housing and an inner circumferential surface of the outer housing;

a second sealing member disposed in an annular shaped second groove in the outer circumferential surface of the inner housing spaced from the first groove, and sealing between the outer circumferential surface of the inner housing and the inner circumferential surface of the outer housing; and a coolant flow channel formed by a region enclosed by the first sealing member, the second sealing member, the inner housing and the outer housing so that through which coolant flows to cool the stator, the inner circumferential surface of the outer housing includes a first cylindrical surface disposed adjacent an opening side and contacting the first sealing member, a second cylindrical surface having a smaller diameter than the first cylindrical surface and disposed closer to a bottom side than the first cylindrical surface and contacting the second sealing member, and a third cylindrical surface having a smaller diameter than the second cylindrical surface and disposed closer to the bottom side than the second cylindrical surface and into which an end part of the inner housing is press-fitted, upon inserting the inner housing in the outer housing, at the time when the first sealing member contacts the first cylindrical surface and the second sealing member contacts the second cylindrical surface, a gap is formed between the end part of the inner housing and the third cylindrical surface in an axial direction of the inner housing.

2. The rotating electric machine according to claim 1, wherein the first sealing member contacts the first cylindrical surface after the second sealing member contacts the second cylindrical surface where the inner housing is inserted into the outer housing.

3. The rotating electric machine according to claim 1, wherein one end of the inner housing includes a flange portion that contacts an opening of the outer housing, and the gap is formed in the axial direction between an end surface of the inner housing and the outer housing when the flange portion contacts the outer housing.

\* \* \* \* \*